INVENTORS
ROBERT A. TORKILDSEN
THOMAS C. HOVIOUS

United States Patent Office 3,580,741
Patented May 25, 1971

3,580,741
UNIVERSAL AUTOMATIC SENSING AND ACTUATING CONTROL SYSTEM FOR FLUID CONSUMING POWER SOURCES AND THE LIKE
Thomas C. Hovious, Peabody, and Robert A. Torkildsen, Danvers, Mass., assignors to General Electric Company
Filed July 29, 1968, Ser. No. 748,469
Int. Cl. H01m 27/12
U.S. Cl. 136—86      8 Claims

ABSTRACT OF THE DISCLOSURE

A combined sensing and output power actuating control system for electrically operable devices such as electric power generation assemblies of the fluid consuming battery type, such as fuel batteries. The control system is comprised by a ratio detector circuit which is coupled, for example, across the output terminals of a fuel battery and also coupled across the last fuel cell unit in the fuel battery for comparing the ratio of the proportional voltage appearing across the last fuel cell to the output terminal voltage of the fuel battery to a preset value and deriving an output trigger signal in response to the ratio varying from the preset value. Timing circuit means are coupled to the output of the ratio detector circuit and are responsive to the output trigger signal from the ratio detector. An output power actuating circuit which is comprised by a purge valve actuator is energized for a predetermined time period by the timing circuit in response to the output from the ratio detector for purging the fuel battery of undesired accumulated inert gaseous matter thereby restoring the fuel battery to full operating capacity.

BACKGROUND OF INVENTION

This invention relates to a new and improved control system for electrically operable devices such as electric power sources of the fluid consuming battery type.

More specifically, the invention relates to an electronic sensing and actuating purging control system for electric power sources of the fluid consuming battery type for sensing the buildup of undesired inert fluid matter in at least one fluid consuming cell of the battery, and thereafter actuating a purging relay for a predetermined time period to accomplish purging of the fluid consuming battery of the undesired inert fluid matter.

The utilization of fluid consuming batteries as electrical power sources is by now well known. In the most common form such a battery is a fuel battery comprised of a plurality of fuel cells. Each fuel cell is comprised of first and second electrodes ionically conductively communicated through an electrolyte. An electrochemically oxidizable fluid conventionally termed a fuel is supplied from an external source to the first electrode while an electrochemically reducible fluid conventionally termed an oxidant is supplied from an external source to the second electrode. The most common fluid fuel supplied to fuel cells is hydrogen, but ammonia, hydrocarbons, hydrazine, carboxylic acids, and a variety of other oxidizable fluids are also known to have utility as fuels. Typically air or oxygen is utilized as an oxidant; however, other readily reducible fluids, notably peroxides and halogen, have also been employed as oxidants. In addition to fuel batteries fluid consuming batteries of a so-called "hybrid" nature are also well known. These batteries differ from fuel batteries in that the cells include one fluid consuming electrode, similar to that of a fuel cell, and one conventional primary or secondary counter electrode. Magnesium-air cells and zinc-air cells have been widely utilized to form fluid consuming batteries.

In a fluid consuming battery the fluid to be consumed is typically delivered serially to the cells. Assuming a pure fluid such as hydrogen, for example, it would be expected that all of the fluid supplied would be consumed and that the battery could be operated indefinitely consuming all of the hydrogen. It has been observed, however, that over a protracted period of operation small quantities of inert fluids associated with the fluid to be consumed will accumulate within the last fluid consuming cell of the battery. As inerts accumulate the last cell of the battery becomes polarized. If inerts are allowed to further accumulate the next to last cell and successive cells will also exhibit polarization. This is, of course, highly undesirable, since power generating capacity of the fluid consuming battery is reduced by polarization and the power output that is delivered is unevenly supplied by the cells placing a greater than desired load on the less polarized cells.

SUMMARY OF THE INVENTION

It is therefore a primary object of this invention to provide a new and improved control system for use with electrically operable, power generation devices of the fluid consuming battery type for sensing the need for, timing the duration of, and providing the mechanism to accomplish automatic, timed, purging of the fluid consuming battery.

Another object of the invention is to provide a control system having the above characteristics which can operate universally over the entire linear range of the output voltage versus load current characteristic of a fluid consuming battery type of power generation assembly, whereby reliable and effective control is exercised over the operation of the assembly irrespective of the instantaneous loading.

In practicing the invention, a combined sensing and output power actuating control system is provided for electrically operable devices such as power generation assemblies of the fluid consuming battery type wherein a predetermined voltage appears across the output terminals thereof, and a predetermined proportional part of the voltage appears across a portion of the device (such as one or more cells) under normal operating conditions. The new and improved control system is comprised by ratio detector circuit means having a first input adapted to be coupled across the output terminals of the battery, and having a second input coupled across the last cell of the battery for comparing the ratio of the voltage of the last cell of the battery to the output terminal voltage of the entire battery. This ratio is compared to a preset value, and an output trigger signal is derived in response to the ratio varying from the desired preset value. An output power actuating circuit is operably coupled to and controlled by the output trigger signal from the ratio detector circuit means for actuating the exciting winding of a purge valve actuating device, such as a control relay, in response to variations beyond a preset value in the ratio of the last cell voltage to the output terminal voltage of the fuel battery. In preferred embodiments of the invention, timing circuit means including a timing capacitor is coupled to the output of the ratio detector circuit means and is responsive to the output trigger signal for controlling the length of time that the output power actuating circuit is energized. The output power purge actuating device and timing circuit are intercoupled in parallel circuit relationship to the output from the ratio detector through a common coupling transistor, the conductivity of which serves to control operation of the purge valve actuating device, and the charging time of the timing capacitor comprising a part of the timing circuit means.

BRIEF DESCRIPTION OF THE DRAWINGS

Other objects, features, and many of the attendant advantages of this invention will be appreciated more readily as the same become better understood by reference to the following detailed description, when considered in connection with the accompanying drawings, wherein like parts in each of the several figures are identified by the same reference character, and wherein.

DETAILED DESCRIPTION OF THE PREFERRED EMBODIMENT

Figure 1:
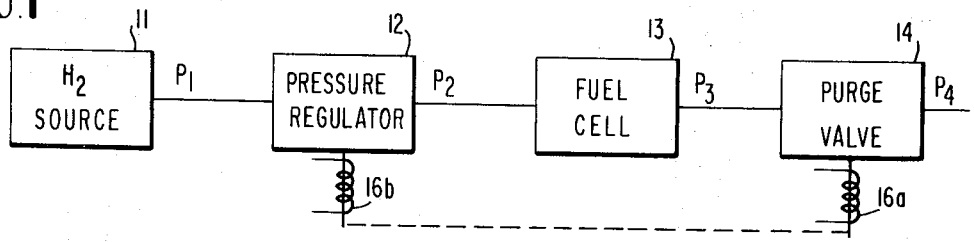
FIG. 1 is a functional block diagram of the hydrogen supply system for an electric power generation assembly of the fuel battery type, and illustrates a preferred application for the control circuit comprising the present invention.

FIG. 1 is a functional block diagram of the hydrogen supply system of a typical power generation assembly of the fuel battery type. In FIG. 1, a hydrogen source shown at 11 supplies hydrogen at a first pressure $P_1$ through a pressure regulator 12 that change the pressure of the hydrogen to a second pressure $P_2$ and supplies the same to the hydrogen input supply port of the fuel battery 13. The fuel battery 13 is normally operated with the exhaust hydrogen pressure at its output side at a third value $P_3$ which is lower than the intermediate value $P_2$ and higher than a fourth value $P_4$ so that the system is able to discharge through a suitable electrically actuated purge valve 14. During normal operation of the fuel battery, the purge valve 14 is closed or adjusted to restrict discharge of hydrogen. The hydrogen at pressure $P_3$ on the output side of fuel battery 13 may be recirculated back to the input side of the fuel battery as disclosed by Christianson in patent application Ser. No. 687,327, filed Dec. 1, 1967, here incorporated by reference. While the fuel battery 13 is operating, the output chamber of the fuel battery at pressure $P_3$ will accumulate inert fluid, which may be impurities initially present in the hydrogen or fluid diffused through the electrolyte. As this inert fluid becomes an appreciable portion of the inventory of the output hydrogen cavity, the performance of the fuel battery will suffer. To prevent this from happening, it is necessary to purge the output hydrogen cavity of the fuel battery so as to reduce the inventory of undesired inert fluid.

One known method of providing a purge of the output hydrogen cavity of the fuel battery 13 is to open the pressure regulator valve 12 and the relay actuated purging valve 14, simultaneously. This allows the input hydrogen from source 11 at the higher input pressure $P_1$ to force hydrogen through the fuel battery at a rate exceeding the operating requirements by opening the output hydrogen cavity to the lower pressure level $P_4$ which is substantially lower than the input hydrogen pressure $P_1$. The instant invention makes available a new and improved electronic control system for sensing the need for, preferably timing the duration of, and providing the mechanism to accomplish automatic purging of the fuel battery in this briefly described manner.

Figures 2, 3:
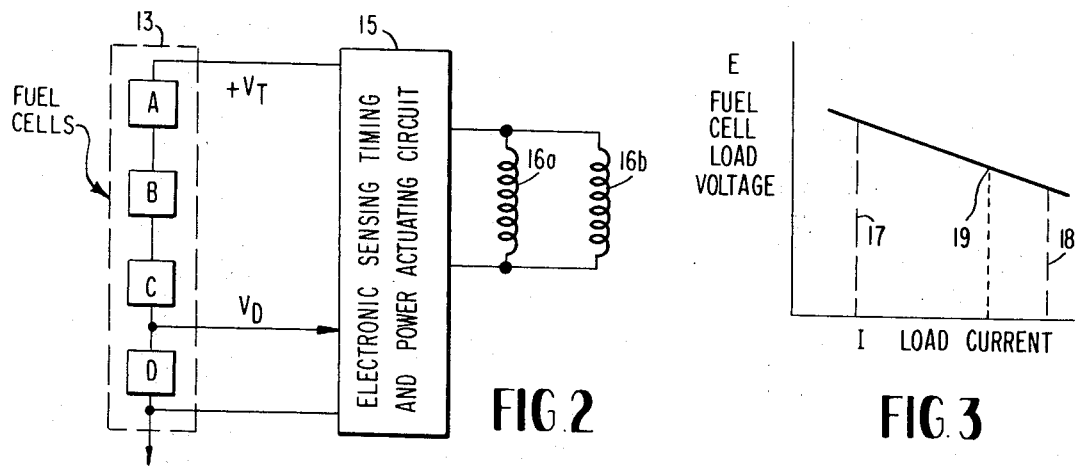
FIG. 2 is a functional block diagram showing the manner of connection of the control circuit comprising the present invention to a fuel battery.
FIG. 3 is a typical characteristic curve showing the output voltage versus load current for an electric power generation system of the fluid consuming battery type, and illustrates the manner in which the load current can influence the output voltage of the system.

FIG. 2 is a functional block diagram of an electronic sensing, timing, and power actuating circuit constructed in accordance with the invention, and illustrates the manner in which the control circuit is coupled to a fuel battery power generation source in accordance with the invention. In FIG. 2, the new and improved electronic sensing, timing, and power actuating circuit is shown at 15 and has its output coupled to actuating windings 16a and 16b for the relay actuated purge valve 14 and pressure regulator 12, respectively, as windings may be controlled by the power actuating circuit of the control system. The fuel battery shown generally in dotted outline form at 13 is comprised by a number of individual fuel cells A, B, C, and D which are illustrated as being connected in series electrical circuit relationship to provide a series output terminal voltage having a value $V_T$. A series hydrogen path exists through the series of cells A–D with the cell A being at the highest potential and also being the first of the unit cells to be supplied from the hydrogen source 11 through the series hydrogen path. Thus, hydrogen introduced into and discharged from cell A will be supplied to cell B, and hydrogen exhausted at the output of cell B will be supplied as inlet hydrogen to cell C, etc. In such an arrangement, all of the undesired inert fluids accumulated in the fuel battery, will tend to build up in the last unit cell D under normal operation. This is due to the sweeping action of the incoming hydrogen. It will be appreciated, therefore, that the performance of the last cell D will suffer before the cells A through C as a consequence of the buildup or accumulation of the undesired inert fluid in the fuel battery.

In accordance with the present invention, the voltage of the last fuel cell D in the fuel battery is sensed in order to determine that purging of the overall system should be initiated. For this purpose, the voltage $V_D$ of the last fuel cell D is supplied to one input of the electronic sensing, timing, and power actuating circuit 15. Under normal operating conditions of the fuel cell, the voltage $V_D$ of the last fuel cell D should constitute some predetermined proportional part of the total voltage $V_T$ of the overall fuel battery. Accordingly, the electronic sensing, timing, and power actuating circuit also has the output terminal voltage $V_T$ supplied to it. The sensing, timing, and actuating circuit then serves to compare the ratio of the proportional voltage $V_D$ to the total voltage $V_T$ of the fuel battery appearing across series connected cells A, B, C, and D, and upon the ratio $V_D/V_T$ dropping below a predetermined value, the control circuit energizes windings 16a and 16b, which results in causing the hydrogen passages of the fuel battery to be purged for a predetermined amount of time.

Referring now to FIG. 3 of the drawing, a typical operating characteristic curve for a fuel battery such as that depicted in FIG. 2 is illustrated. In this curve, the fuel battery load voltage shown as E is plotted against the load current I. From a consideration of this curve, it will be seen that at no load and lower load currents, depicted to the left of the dashed line 17, the voltage E is higher than at larger load currents, depicted to the right of the dashed line 18. Accordingly, it will be appreciated that at some intermediate operating point such as that shown by the dashed line 19, the output load voltage E will be at some intermediate value between the higher value intercepted by line 17 and the lower value identified by the interception of line 18 with the load characteristic curve. By employing the ratio $V_D/V_T$ rather than the absolute value of the voltage $V_D$, the electronic sensing, timing, and power actuating control circuit will operate universally over the entire linear or substantially linear portion of the voltage-ampere characteristic of the fuel battery to assure reliable operation of the system by properly initiating purging of the battery irrespective of the instantaneous value of the load current. The ratio $V_D/V_T$ may be used over the entire, linear voltage-ampere region due to the fact that this ratio remains constant irrespective of the operating point of the system within the linear range, and hence is independent of load current. This is best depicted in FIG. 3, where it will be appreciated that the ratio $V_D/V_T$ will be the same for all three operating points depicted by the intersection of the lines 17, 18 and 19 with the load voltage versus load current operating characteristic curve.

Figure 4:
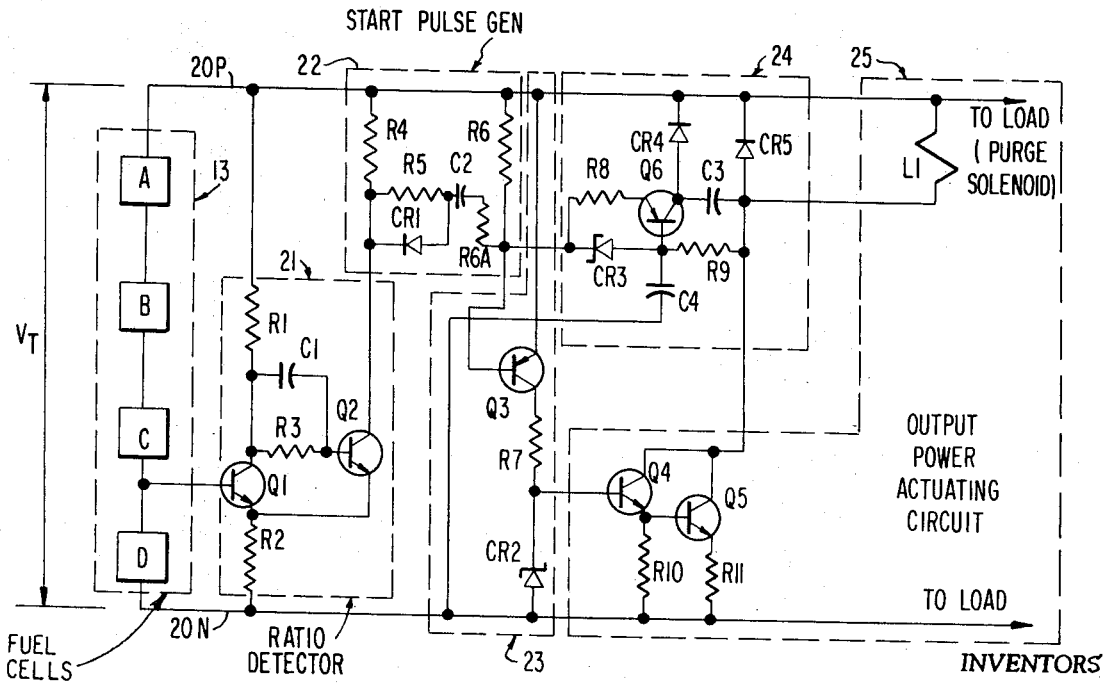
FIG. 4 is a detailed circuit diagram of a preferred form of electronic control system constructed in accordance with the invention.

FIG. 4 is a detailed circuit diagram of a preferred form of an electronic sensing, timing and power actuating control circuit constructed in accordance with the invention and shows the circuit connected in operating electrical relationship with a fuel battery 13. The terminal output voltage $V_T$ from the fuel battery 13 is supplied across a pair of power supply terminals 20P and 20N. This terminal output voltage $V_T$ is supplied to a ratio detector circuit means 21 along with the proportional voltage $V_D$ representative of the voltage across the last fuel cell D. The ratio circuit 21 compares the ratio $V_D/V_T$ to a preset value, and upon this ratio varying (within limits) from the preset value, deliver an output signal trigger pulse to a wave shaping differentiating circuit 22 whose output in turn is supplied to a coupling transistor circuit means 23. The coupling transistor circuit means 23 is connected in common to a timing circuit means 24 and an output power actuating circuit means 25. The arrangement is such that the output power actuating circuit means 25 is coupled to and controlled at least in part by the timing circuit 24 and supplies energizing current for a preset time period to a purge control relay winding comprising a part of the output power actuating circuit means.

The ratio detector circuit means 21 comprises first and second NPN transistors $Q_1$ and $Q_2$ wherein the first transistor $Q_1$ has its emitter-collector connected in series circuit relationship with a first resistor $R_1$ and a second resistor $R_2$ across the power supply terminals 20P and 20N. The base electrode of first transistor $Q_1$ is connected to the voltage appearing across the last cell D only of the fuel battery 13, and hence has the proportional voltage $V_D$ applied to the base thereof. The second transistor $Q_2$ has its emitter connected in common with the emitter of the first transistor $Q_1$ through the second resistor $R_2$ to the negative power supply terminal 20N and the base of the second transistor $Q_2$ is connected to the collector of the first transistor $Q_1$ through a parallel connected resistor-capacitor coupling network $R_3$ and $C_1$. The trigger output signals supplied by the ratio detector circuit 21 are obtained from the collector of the second transistor $Q_2$ which is connected through a suitable load resistor $R_4$ to the positive power supply terminal 20P.

In operation, the values of the first and second resistors $R_1$ and $R_2$ are properly proportioned relative to the output terminal voltage $V_T$ appearing across the terminals 20P and 20N and the proportional voltage $V_D$ of the last unit cell D so that the transistor $Q_1$ is normally conducting. As a consequence of the common coupling of the emitters to resistors $R_2$, the second transistor $Q_2$ will be maintained off. During operation, upon the numerical ratio $V_D/V_T$, dropping below the predetermined value, the transistor $Q_1$ will be turned off, and the transistor $Q_2$ will be turned through a Schmitt trigger action brought about by reason of the $R_3$-$C_2$ coupling network of the common emitter-resistor $R_2$. This results in producing a sharp, negative going, voltage pulse on the collector of the second transistor $Q_2$.

The negative going, voltage pulse appearing on the collector of transistor $Q_2$ is supplied through a differentiating circuit comprised primarily of a capacitor $C_2$ and resistor $R_6$ and $R_{6a}$ where the voltage pulse is differentiated to produce a negative pulse of current that is supplied to the base electrode of the coupling transistor circuit means 23. The coupling transistor circuit means 23 is comprised by a PNP transistor $Q_3$ having its emitter connected directly to the positive power supply terminal 20P and its collector connected through a series connected resistor $R_7$ and the first Zener diode $CR_2$ to the remaining terminal 20N.

The power actuating circuit is comprised by first and second regeneratively intercoupled NPN power actuating transistors $Q_4$ and $Q_5$ having the collectors thereof connected in parallel through the actuating coil $L_1$ of a purge valve actuating device, such as a relay to the positive power supply terminal 20P. The emitters of first and second power actuating transistors $Q_4$ and $Q_5$ are connected through respective bias transistors $R_{10}$ and $R_{11}$ to the negative power supply terminal 20N. The base electrode of second power actuating transistor $Q_5$ is connected to the emitter of first power actuating transistor $Q_4$, and the base electrode of transistor $Q_4$ is connected to the juncture between resistor $R_7$ and Zener diode $CR_2$. The two power actuating transistors $Q_4$ and $Q_5$ as thus comprised form a Darlington pair for supplying energizing current to the purge valve control device actuating winding $L_1$.

Upon the power actuating transistors $Q_4$ and $Q_5$ being turned on by coupling transistor $Q_3$, a load voltage appears across the purge valve control device actuating winding $L_1$ which is fed back through a voltage feedback circuit comprised of a feedback resistor $R_9$. Feedback resistor $R_9$ is connected between the juncture of the relay winding $L_1$ and collectors of the power transistors $Q_4$ and $Q_5$, and the base of a charging transistor $Q_6$. The feedback resistor comprises a part of the timing circuit 24 which further includes a charging capacitor $C_3$ and charging transistor $Q_6$. The base of the charging transistor $Q_6$ is connected to the juncture of the resistor $R_9$ with a second Zener diode $CR_3$ for limiting the emitter-base voltage of charge transistor $Q_6$. A charging current limiting resistor $R_8$ is connected between the emitter of charging transistor $Q_6$ and the base of coupling transistor $Q_3$. The collector of the charging transistor $Q_6$ is connected to one terminal of the charging capacitor $C_3$ with the other terminal of the charging capacitor being connected to the juncture of the purge valve control device coil $L_1$ with feedback resistor $R_9$. First and second diodes $CR_4$ and $CR_5$ are provided for discharging and limiting the charge on capacitor $C_3$, respectively, upon turn-off of $Q_3$. Diodes $CR_4$ and $CR_5$ have the anodes thereof connected to respective terminals of the charging capacitor $C_3$ and the cathodes thereof connected to the positive power supply terminal 20P. A stabilizing capacitor $C_4$ is connected between the base of the charging transistor and the remaining power supply terminal 20N for offsetting any tendency of the circuit to develop ringing oscillations between capacitor $C_3$ and winding $L_1$. In operation, the ratio of the last cell voltage to the fuel cell output terminal voltage $V_D/V_T$ forms the input to the ratio detector 21. Upon this numerical ratio decreasing beyond the design point determined by the values of the resistors $R_1$ and $R_2$, the fuel cell output terminal voltage $V_T$, and the characteristics of transistors $Q_1$ and $Q_2$ of the ratio detector transistor $Q_1$ which previously had been conducting is turned off. As $Q_1$ starts to turn off, $Q_2$ is turned on through Schmitt trigger action causing a sharp negative voltage trigger pulse to be produced across the load resistor $R_4$. This negative voltage pulse is further shaped by differentiating circuit 22 which is comprised by capacitor $C_2$ and resistors $R_6$ and $R_{6a}$ and which supplies a negative current pulse to the base of the coupling transistor $Q_3$.

The pulse of negative current into the base of the coupling transistor $Q_3$ initiates current flow in coupling transistor $Q_3$ between the emitter and collector thereof. This emitter-collector current flow results in turning power actuating transistors $Q_4$ and $Q_5$ full on, thereby energizing the purge valve control device winding $L_1$. The voltage drop that appears across purge valve control device winding $L_1$ is fed back through the feedback path comprised by resistor $R_9$ to the base of the charging transistor $Q_6$. As a result, charging transistor $Q_6$ will be turned on to in effect couple the feedback voltage appearing across purge value control device winding $L_1$ back through its base-emitter to the base of the coupling transistor $Q_3$ to keep transistor $Q_3$ turned on. During this operation the second Zener diode $CR_3$ will operate to limit the emitter-base voltage of charging transistor $Q_3$ and hence to limit the voltage fed back to the base of coupling transistor $Q_3$. The components $R_8$, $Q_6$, charging capacitor $C_3$, feedback resistor $R_9$ and Zener diode $CR_3$ will act as a current regulator that linearly charges the charging capacitor $C_3$. The current for charging capacitor $C_3$ will be provided by the emitter-base circuit of coupling transistor $Q_3$, and hence assures a continuous drive on coupling transistor $Q_3$. By maintaining $Q_3$ turned on, a voltage will appear continuously across the purge valve control device winding $L_1$ until such time that the capacitor $C_3$ is charged sufficiently to reduce the current through coupling transistor $Q_3$ to a value which is insufficient to drive the power actuating transistors $Q_4$ and $Q_5$. Upon this occasion, the current stops flowing in all transistor elements, and the charging capacitor $C_3$ will discharge through the purge valve control device winding $L_1$ and release the purge control device winding to thereby terminate the purge-interval.

From the foregoing description, it will be appreciated that the invention provides a new and improved control system for use with electrically operable devices of the fluid consuming battery type for sensing the need for, timing the duration of, and providing the mechanism to accomplish automatic timed purging of the fluid consuming battery. While the invention has been specifically described with reference to a fuel battery utilizing hydrogen as a fluid fuel, it is appreciated that the system could be used with any conventional fuel battery fuel or oxidant, or with any consumable fluid where a hybrid type of fluid consuming battery is utilized. While we have disclosed our invention with reference to a fuel battery in which one fluid supplied for consumption is purged in response to cell polarization, it is recognized that where a fuel and oxidant are both being serially supplied to a fuel battery, it may be desirable to utilize our invention to purge both the fuel and oxidant passages of the fuel battery.

The control system is designed in such a manner that it can operate universally over the entire linear range of the output voltage versus load current characteristics of a power generation assembly since it is designed to respond to the ratio $V_D/V_T$ of the last cell voltage of the fluid consuming battery terminal output voltage in determining the need to initiate a timed purge cycle, and consequently provides reliable and effective control over the operation of the battery irrespective of the instantaneous loading on the assembly. While the battery is described with reference to four cells, it is recognized that any fluid consuming battery having two or more cells may be utilized. $V_D$ may be the voltage across one cell or across several adjacent cells. Similarly, $V_T$ need not be the voltage across all the cells, it being only necessary that $V_T$ be the voltage across a larger number of cells than $V_D$.

While the sensing and output power actuating control system has been disclosed primarily in connection with the purging of fluid consuming battery power sources, it is believed obvious that the control could be used in other applications where its universal load voltage-load current operating characteristic makes such application desirable. It is recognized further that the specific circuit components shown in FIG. 4 are intended merely to illustrate one specific circuit and that other circuit components may be utilized. For example, where reference is made to NPN transistors PNP transistors may be substituted merely by reversing the polarity of interconnection to the battery. Instead of providing separate windings to actuate the pressure regulator and purge valve, it is recognized that a single winding may be used to service both. The purge valve control device is preferably a solenoid, but may also take other conventional forms, such as a motor, etc. It is appreciated that numerous similar circuit modifications will readily occur to those skilled in the art. It is accordingly intended that the scope of the invention be determined with reference to the following claims:

What we claim and desire to secure by Letters Patent of the United States is:

1. A combined sensing and output power actuating control system for an electrically operable device of the type having a predetermined voltage appearing across the terminals thereof and a predetermined proportional part of the voltage appearing across a portion thereof under normal operating conditions comprising, ratio detector circuit means adapted to be coupled across the terminals of the device and the portion thereof having the predetermined proportional voltage appearing thereacross for comparing the ratio of the proportional voltage and the terminal voltage to a preset value and deriving an output trigger signal in response to any variation of the ratio from the preset value, timing circuit means including a timing capacitor coupled to the output of said ratio detector circuit means and responsive to the output trigger signal from said ratio detector circuit means, an output power actuating circuit means including load impedance means coupled to and controlled at least in part by timing circuit means for actuating controlled valve means in response to any variations in the ratio of voltages, coupling transistor means coupled to the output from said ratio detector circuit means for intercoupling said output power actuating means and said timing circuit means in parallel circuit relationship, the conductivity of said coupling transistor means serving to control operation of the output power actuating circuit and the charging time of said timing capacitor, means for coupling the voltage developed across said load impedance back to the coupling transistor means for maintaining the coupling transistor means conductive and thereby charge the timing capacitor to the predetermined charge condition to thereby render the coupling transistor means non-conductive.

2. A control system according to claim 1 wherein wave shaping circuit means are intercoupled intermediate the output of the ratio detector circuit means and the coupling transistor means for improving the shape of the output trigger signal produced by said ratio detector circuit means prior to application of the signal to the coupling transistor means.

3. A combined sensing and power actuating control system for a fuel consuming electric power generating system comprising a plurality of fuel cell units, whereby a predetermined voltage appears across all of the fuel cell units making up the system and a predetermined proportional part of the voltage appears across the last cell in the assembly under normal operating conditions comprising, ratio detector circuit means adapted to be coupled across the terminals of the system and across the last cell for comparing the ratio of the voltage across the system and across the cell to a preset value and deriving an output trigger signal in response to any variation of the ratio from the preset value, timing circuit means including a timing capacitor coupled to the output of said ratio detector circuit means and responsive to the output trigger signal from said ratio detector means, output power actuating circuit means including a purging relay for purging the fuel cell assembly of undesired accumulated gaseous matter for a predetermined time period, coupled to and controlled at least in part by said timing circuit means, a coupling transistor means coupled to the output from said ratio detector circuit means, said output power actuating means and said timing circuit means being intercoupled in parallel circuit relationship to the output of said ratio detector circuit means through said coupling transistor means in common, the conductivity of said coupling transistor means serving to control operation of the purging relay comprising the output power actuating circuit and the charging time of said timing capacitor in said timing circuit means with said timing capacitor serving to turn off the coupling transistor means on attaining a predetermined condition, means for coupling the voltage developed across the purging relay back to the coupling transistor means for maintaining the coupling transistor means conductive and thereby charge the timing capacitor to the predetermined charge condition whereupon the coupling transistor means is rendered non-conductive.

4. A control system according to claim 3 wherein said ratio detector circuit means comprises first and second NPN transistors, the first transistor having its emitter-collector connected in series circuit relationship with first and second resistors with the series circuit thus comprised being connected across the terminals of the electrically operable device to be controlled and the base electrode of the first transistor being coupled to the proportional part of the voltage produced during normal operation of the device, the emitter of said second transistor being connected in common with the emitter of the first transistor to the first resistor, the base electrode of the second transistor being coupled through a parallel connected resistor-capacitor coupling network to the collector of the first transistor and the collector of the second transistor being connected to a source of suitable operating potential, the trigger output signals from the ratio detector circuit means being obtained from the collector of the second transistor.

5. A control system according to claim 4 wherein the power actuating circuit comprises first and second regeneratively intercoupled NPN power actuating transistors having the collectors thereof connected in parallel through the actuating coil of the purging relay to one terminal of the power generation assembly and with the emitters thereof being connected through respective bias resistors to the remaining terminal of the power generation assembly, the base electrode of the second power actuating transistor being connected to the emitter of the first power actuating transistor and the base of the first power actuating transistor being connected to the output from said coupling transistor means.

6. A control system according to claim 5 wherein the coupling transistor means comprises a PNP transistor having its emitter connected to that terminal of the power generation assembly to which the purging relay actuating coil is connected, its base coupled to the output from the ratio detector circuit means and its collector connected through a series connected load resistor and first Zener diode to the remaining terminal of the power generation assembly, the base of the first power actuating transistor being connected to the juncture of the load resistor and the first Zener diode.

7. A control system according to claim 6 wherein the timing circuit means further includes a PNP charging transistor, a voltage feedback circuit comprised by a feedback resistor connected between one terminal of the purging relay actuating coil and the base of a charging transistor, the emitter of the charging transistor being connected to the base of the coupling transistor, a Zener diode connected across the emitter-base of the charging transistor, a charging current limiting resistor connected between the base of the coupling transistor and the emitter of the charging transistor, the collector of the charging transistor being connected to one terminal of the charging capacitor and the remaining terminal of the charging capacitor being connected to the juncture of the purge valve actuating coil and the feedback resistor, first and second diodes having the anodes thereof connected to respective terminals of the charging capacitor and the cathodes thereof connected to that terminal of the power generation assembly to which the purge valve relay actuating coil is connected, and a stabilizing capacitor connected between the base of the charging transistor and the remaining terminal of the electric power generation assembly to which the emitters of the first and second power actuating transistors are connected.

8. A control system according to claim 7 further including differentiating circuit waveshaping means interconnected between the collector of the second transistor in the ratio detector circuit means and the base of the coupling transistor for improving the shape of the output trigger signal supplied from the ratio detector circuit means to the coupling transistor.

References Cited

UNITED STATES PATENTS

| 3,256,116 | 6/1966 | Justi et al. | 136—86(B) |
| 3,317,348 | 5/1967 | Winsel | 136—86(B) |
| 3,343,046 | 9/1967 | Ladd, Jr. | 317—148.5 |
| 3,344,319 | 9/1967 | Schimsky | 317—148.5 |

J D MILLER, Primary Examiner

A. D. PELLINEN, Assistant Examiner

U.S. Cl. X.R.

317—148.5; 323—19